(12) United States Patent
Tateishi

(10) Patent No.: US 6,798,426 B1
(45) Date of Patent: Sep. 28, 2004

(54) CHARACTER IMAGE DISPLAY CONTROL METHOD AND APPARATUS, AND STORAGE MEDIUM THEREFOR

(75) Inventor: Kazuhiro Tateishi, Matsudo (JP)

(73) Assignees: Konami Co., Ltd. (JP); Konami Computer Entertainment Tokyo Co., Ltd. (JP)

( * ) Notice: Subject to any disclaimer, the term of this patent is extended or adjusted under 35 U.S.C. 154(b) by 0 days.

(21) Appl. No.: 09/287,239

(22) Filed: Apr. 6, 1999

(30) Foreign Application Priority Data

Apr. 7, 1998 (JP) .......................................... 10-094933

(51) Int. Cl.[7] ................................................ G09G 5/00
(52) U.S. Cl. ........................ 345/706; 345/710; 702/176
(58) Field of Search ..................... 463/23, 31; 702/176; 345/112, 706, 707, 708, 710; 273/434

(56) References Cited

U.S. PATENT DOCUMENTS

| | | | |
|---|---|---|---|
| 5,358,259 A | * 10/1994 | Best | 463/31 |
| 5,553,864 A | * 9/1996 | Sitrick | 463/31 |
| 5,649,862 A | 7/1997 | Sakaguchi et al. | |
| 5,991,705 A | * 11/1999 | Klein et al. | 702/176 |
| 6,290,602 B1 | * 9/2001 | Kawano | 463/23 |

FOREIGN PATENT DOCUMENTS

| | | |
|---|---|---|
| DE | 297 15 105 U1 | 6/1997 |
| EP | 0 768 105 A2 | 4/1997 |
| EP | 0 871 137 A1 | 10/1998 |

OTHER PUBLICATIONS

Japanese Magazine "Game Walker"; Jul., 1996.

\* cited by examiner

Primary Examiner—Dennis-Doon Chow
Assistant Examiner—Srilakshmi K. Kumar
(74) Attorney, Agent, or Firm—Lerner, David, Littenberg, Krumholz & Mentlik, LLP

(57) ABSTRACT

Upon making an input selection request to a player, an idle time for an expected command input from the player is calculated, and further, an elapsed time after making the input selection request is counted. If no command input is given from the player within a lapse of the idle time, expression of a character image being displayed is changed, and further, the idle time is shortened for the next input selection request.

30 Claims, 10 Drawing Sheets

| CHARACTER ID DATA | STANDARD IDLE TIME |
|---|---|
| CHARACTER A | 12 sec |
| CHARACTER B | 10 sec |
| CHARACTER C | 13 sec |
| CHARACTER D | 10 sec |
| CHARACTER E | 40 sec |
| CHARACTER F | 14 sec |
| CHARACTER G | 8 sec |
| CHARACTER H | 10 sec |
| CHARACTER I | 15 sec |
| CHARACTER J | 9 sec |
| CHARACTER K | 16 sec |
| CHARACTER L | 11 sec |
| CHARACTER M | 12 sec |
| CHARACTER N | 7 sec |

| FEELING | CARRECTION VALUE |
|---|---|
| I | -3 sec |
| II | -1.5 sec |
| III | ±0 sec |
| IV | +2 sec |
| V | +4 sec |

CHARACTER IMAGE DISPLAY CONTROL METHOD AND APPARATUS, AND STORAGE MEDIUM THEREFOR

BACKGROUND OF THE INVENTION

1. Field of the Invention

The present invention relates to an image display control technique for dynamically changing a display manner of a character image according to presence/absence of a command input relative to an input selection request in, for example, a video game apparatus.

2. Description of the Related Art

In recent years, various kinds of simulation game apparatuses have been actively developed. In some simulation game apparatuses, attractiveness is enhanced by not only allowing a player (operator of the game apparatus) to operate motion of a character image, but also making the game itself storyful.

As the storyful simulation game apparatuses of one kind, there are available affectional simulation game apparatuses which aim to promote affectional feelings of heterosexual characters relative to a player. In such affectional simulation game apparatuses, parameter data are used for representing the degrees of affectional feelings or friendship of the heterosexual characters relative to the player. By effectively dealing with events, such as dates, and dialogues like dealing with heterosexual persons in actual life, the player can enjoy the game while promoting affectional feelings of the heterosexual characters relative to the player and viewing the course of changes of display manners of images of the characters.

In the foregoing affectional simulation game apparatuses, the dialogue between the player and the heterosexual character is normally advanced by means of an interactive command input by the player using a given input selection image so as to reflect the result of the dialogue on an affectional feeling of the character. Thus, if no command input is given by the player, the development of the game is stopped.

In view of this, various measures have been taken for urging the player to input a command. For example, in some affectional simulation game apparatuses, the passage or progress of time is shown to the player via an image interface until the termination of a maximum response waiting time for a command input by the player, i.e. the termination of an idle time, after the display of an input selection image up to the command input by the player. Specifically, the display contents of the image interface are set in advance per input selection image, and the passage of the idle time is shown at a particular area of the image interface so as to allow the user to confirm it along with options to be answered.

However, the foregoing technique only shows the passage of time in a visible fashion until the termination of an idle time, and does not reflect it upon the display manner of a character image. Thus, a feeling of tension can not be given to the player. Accordingly, if no command input is carried out by the player, the game can not progress all the same, and thus the display manner of the character image also becomes changeless.

SUMMARY OF THE INVENTION

Therefore, it is an object of the present invention to provide a character image display control method which can reflect a command input state relative to an input selection request upon an image display manner.

It is another object of the present invention to provide an image display control apparatus for carrying out the foregoing display control method.

It is another object of the present invention to provide a storage medium for realizing functions of the foregoing Image display control using a computer.

According to one aspect of the present invention, there is provided, in an apparatus which displays a character image with expression on a display unit and performs a subsequent display process after receiving a command input from a player in response to an input selection request with respect to the character image being displayed, a display control method comprising the steps of counting, upon every occurrence of the input selection request, an elapsed time after the occurrence of the input selection request in a state invisible to the player; and changing, unless the command input is given by the player until a time point when the elapsed time reaches an idle time set for the command input, the expression of the character image being displayed on the display unit.

It may be arranged that when the command input is not given until the time point, the subsequent display process differs from what is performed when the command input is given until the time point.

It may be arranged that the character image is selected from a plurality of character images each of which has its own idle time.

It may be arranged that the idle time is determined by a function of a standard idle time predetermined for the character image and parameter data which are updated based on a past command input state of the player relative to the character image.

It may be arranged that the standard idle time is set depending on a personality feature of the character image.

It may be arranged that when the command input is not given until the time point, the parameter data are updated so as to shorten the idle time for the next input selection request with respect to the character image.

It may be arranged that expression of the character image is changed based on the parameter data.

It may be arranged that the command input from the player is interactively carried out via the display unit.

It may be arranged that the command input from the player is given by sound.

According to another aspect of the present invention, there is provided an image display control apparatus comprising an image processing section which displays a character image with expression on a display unit; a request offering section which offers an input selection request to a player; a counting section which counts an elapsed time after offering the input selection request in a state invisible to the player; an idle time determining section which determines an idle time for a command input by the player in response to the input selection request; and a control section which, when the command input is not given by the player until a time point when the elapsed time reaches the idle time, changes expression of the character image being displayed.

It may be arranged that the character image is selected from a plurality of character images each of which has its own idle time.

It may be arranged that the idle time determining section determines the idle time based on a function of a standard idle time predetermined for the character image and parameter data which are updated based on a past command input state of the player relative to the character image.

It may be arranged that the parameter data are stored in an exchangeable memory, and that the idle time determining section determines the idle time based on the function of the current parameter data read out from the memory and the standard idle time.

It may be arranged that the control section changes expression of the character image based on the parameter data.

It may be arranged that when the command input in response to the input selection request is not given until the time point, the control section performs a subsequent display process which differs from what is performed when the command input is given until the time point.

It may be arranged that when the command input is not given until the time point, the control section updates the parameter data so as to shorten a next value of the idle time.

It may be arranged that the image display control apparatus further comprises an image interface section which controls the display unit to display an inputting Image for carrying out the command input interactively.

It may be arranged that the image display control apparatus further comprises a sound input section which allows the command input to be performed by sound.

According to another aspect of the present invention, there is provided an image display control apparatus comprising an image processing section which selectively displays one of character images with expressions on a display unit; a request offering section which interactively offers to a player an input selection request for a command input triggering a subsequent display process; an idle time determining section which determines an idle time for the command input by the player in response to the input selection request; a counting section which counts an elapsed time after offering the input selection request in a state invisible to the player; and a control section which, when the command input is not given by the player until a time point when the elapsed time reaches the idle time, changes expression of the character image being displayed and causes the subsequent display process to differ from what is performed when the command input Is given until the time point.

It may be arranged that the idle time determining section determines the idle time based on a function of a standard idle time predetermined for the character image and parameter data which are updated based on a past command input state of the player relative to the character image.

It may be arranged that the parameter data are stored in an exchangeable memory along with parameter data for the other character images, and that the idle time determining section determines the idle time based on the function of the parameter data read out from the memory and the standard idle time.

It may be arranged that the control section changes expression of the character image based on the parameter data.

It may be arranged that when the command input is not given until the time point, the control section updates the parameter data so as to shorten a next value of the idle time for the character image.

According to another aspect of the present invention, there is provided a computer-readable recording medium storing a program which causes a computer connected to a display unit and a data input unit to execute a process of displaying a character image with expression on the display unit; a process of offering to a player an input selection request with respect to the character image and counting an elapsed time after offering the input selection request in a state invisible to the player; a process of determining an idle time for a command input from the player via the data input unit in response to the input selection request; and a process of, when the command input is not given via the data input unit until a time point when the elapsed time reaches the idle time, changing expression of the character image being displayed.

It may be arranged that the character image is selected from a plurality of character images each of which has its own idle time.

It may be arranged that the program causes the computer to execute a subsequent display process awaiting the command input in response to the input selection request.

It may be arranged that the program causes the computer to, when the command input is not given until the time point, render the subsequent display process different from what is performed when the command input is given until the time point.

It may be arranged that the program causes the computer to execute a process of interactively receiving the command input from the player via the display unit.

It may be arranged that the program causes the computer to execute a sound input function of receiving the command input from the player by sound.

It may be arranged that the process of determining the idle time is a process of obtaining a standard idle time predetermined for the character image and parameter data which are updated based on a past command input state of the player relative to the character image and determining the idle time based on the obtained standard idle time and parameter data.

It may be arranged that the standard idle time is set depending on a personality feature of the character image.

It may be arranged that when the command input is not given until the time point, the parameter data are updated so as to shorten a next value of the idle time for the character image.

It may be arranged that the program causes the computer to change expression of the character image based on the parameter data.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a preferred embodiment of the present invention will be described hereinbelow with reference to the accompanying drawings, wherein an image display control technique of the present invention is applied to an affectional simulation game apparatus as a video game apparatus.

In this embodiment, there appear a plurality of characters to be affectional target candidates relative to a player, and a character image with expression is formed for each of the characters. Expression is diversely changed depending on a command input state of the player.

Image element data for producing expression (face expression, speech, motion) of each character image, affectional progressing element data, such as a game story, input selection request images and response dialogues (words), and tone generator data, and other affectional progressing element data are stored in a CD-ROM as one example of a storage medium. The CD-ROM further stores a standard idle time determined for each character image. When identification data of a character image is specified, the standard idle time can be retrieved using it as a key.

The CD-ROM also stores a program (program codes) which, cooperative with a later-described basic apparatus being a computer, constitutes a video game apparatus when read into and used by the basic apparatus. Hereinafter, this program will be referred to as "game program". In the following description, it is assumed that the game program also includes data and control parameters necessary for execution thereof.

In the description hereinbelow, a character image may be simply referred to as a character when it does not directly relate to image processing.

First, the basic apparatus for constituting the video game apparatus according to the preferred embodiment of the present invention will be described hereinbelow.

The basic apparatus reads out the game program from the foregoing CD-ROM which is exchangeable and portable, and executes it so as to produce character images etc. display them on a display unit 25 and control display manners thereof. As the basic apparatus, one described in, for example, U.S. Pat. No. 5,757,376 can be used.

Figure 1:
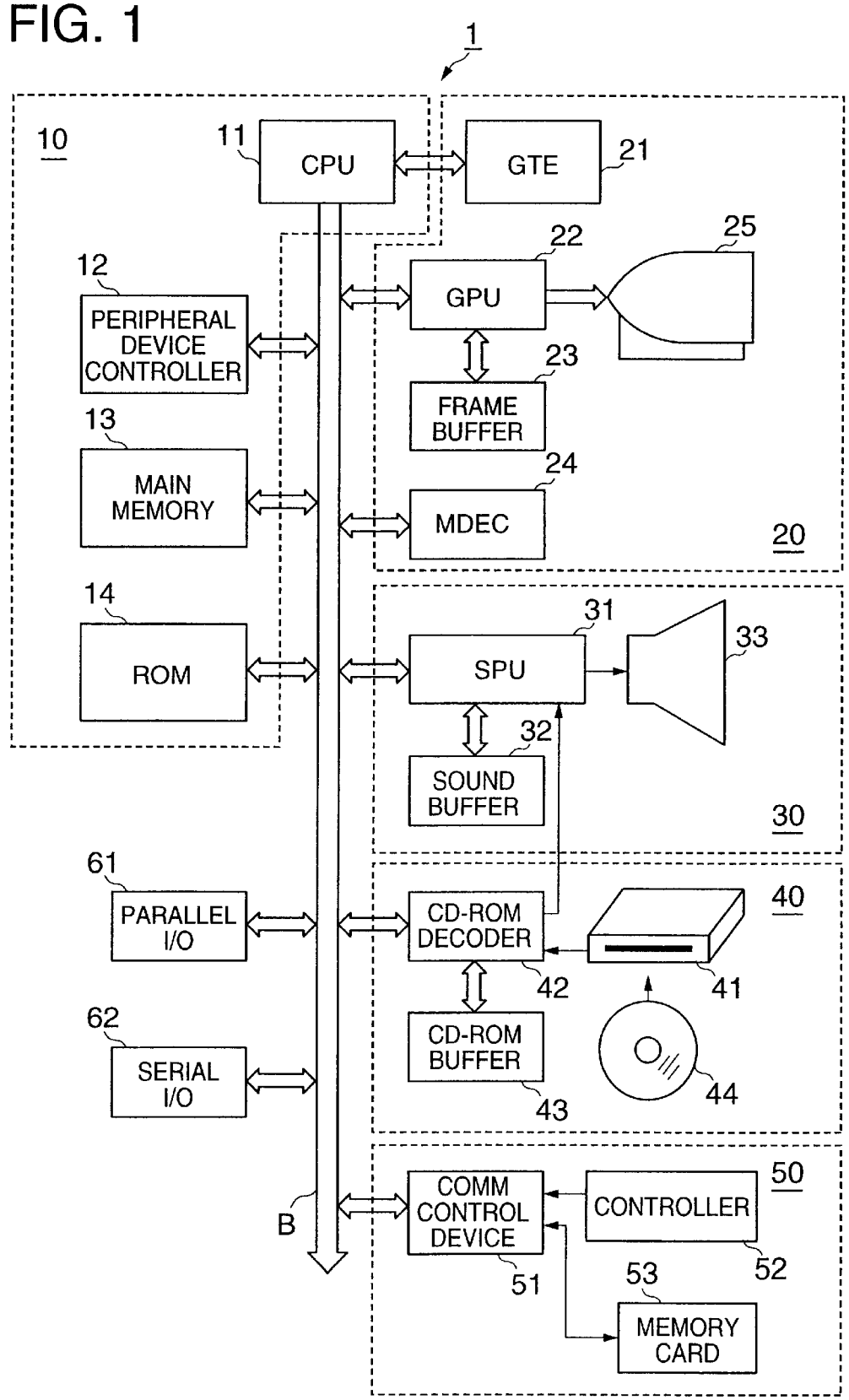
FIG. 1 is a block diagram showing a hardware structure of a basic apparatus to which the present invention is applied.

Specifically, as shown in FIG. 1, the basic apparatus 1 comprises a main control section 10, an image processing section 20, a sound processing section 30, a disk control section 40, a communication control section 50 and a main bus B connecting the foregoing functional blocks 10 to 50 to allow two-way communications among them.

The main control section 10 comprises a CPU 11, a peripheral device controller 12 for carrying out an interrupt control and a DMA (direct memory access) transfer control, a main memory 13 for temporarily storing the game program and various data read out from the CD-ROM 44, and a ROM 14 for storing an operating system (OS) for managing the foregoing sections 20 to 50. The CPU 11 is a RISC (reduced Instruction set computer) CPU, executing the OS stored in the ROM 14 to control the basic operation of the whole apparatus and further executing the game program stored in the main memory 13 to create a plurality of functional blocks which will be described later.

The image processing section 20 comprises a geometry transfer engine (GTE) 21 carrying out high-speed coordinate transformation relative to image element data read out from the CD-ROM 44 and stored in the main memory 13 and so forth, a graphics processing unit (GPU) 22 for drawing Images composed of combinations of polygons, such as triangles and quadrilaterals, and sprites according to drawing commands from the CPU 11, a frame buffer 23 for temporarily storing the images drawn by the GPU 22, and an image decoder (MDEC) 24 for decoding compressed image data according to necessity. The display unit 25 reads out the images data stored in the frame buffer 23 and displays them. A television for home use may be used as the display unit 25. In this case, a connection interface is provided between the television and the GPU 22.

By consecutively executing the drawing by the GPU 22 and the storing into the frame buffer 23, the character images including motion elements and background images thereof can be displayed on the display unit 25.

The sound processing section 30 comprises a sound processing unit (SPU) 31 for reproducing voices, sounds, sound effects, background tones and other tones (hereinafter referred to as "voices etc.") according to tone generator data stored in the CD-ROM 44, a sound buffer 32 for temporarily storing the reproduced voices etc. and a loudspeaker 33 for outputting the voices etc. stored in the sound buffer 32. The SPU 31 has an ADPCM decoding function of, for example, decoding tone generator data subjected to adaptive differential pulse code modulation (ADPCM) and storing them in the sound buffer 32, a function of producing voices etc. by reproducing tone generator data stored in the sound buffer 32, a modulating function of modulating and reproducing tone generator data stored in the sound buffer 32, and so forth.

The disk control section 40 comprises a disk drive 41 for reproducing the game program and data (hereinafter collectively referred to as "reproduced data") stored in the CD-ROM 44, a CD-ROM decoder 42 for decoding the reproduced data when error correcting codes (ECC) are added thereto, and a CD-ROM buffer 43 for temporarily storing the reproduced data from the disk drive 41 before storing them into the main memory 13. The CD-ROM decoder 42 constitutes a part of the sound processing section 30. An audio output from the CD-ROM decoder 42 is once inputted into the SPU 31 where it is mixed with an SPU output, and then inputted into a reverb unit so as to be a final audio output.

The communication control section 50 comprises a communication control device 51 for controlling communication with the CPU 11 via the main bus B, a controller 52 for inputting commands from a game player, and a memory card 53 for storing the setting of a game etc.

The controller 52 is an interface for inputting commands from the player and includes a start key for commanding the start or restart of a game, a reset key for commanding the reset of the game, a selection key for commanding movement of a character image in longitudinal and transverse directions and moving a cursor to desired one of menus or items, a command key for commanding detailed motion of the character image and commanding a selected menu, and so forth. The controller 52 transmits the state of each key to the communication control device 51 in synchronous communication.

The communication control device 51 notifies the state of each key of the controller 52 to the CPU 11. In this fashion, the commands from the player are given to the CPU 11 so that the CPU 11 performs an image displaying process and a game developing process based on the executing game program according to the commands from the player.

If the setting of a progressing game, the final or intermediate result of the game or the like needs to be stored, the CPU 11 sends the necessary data to the communication control device 51 which then stores the data sent from the CPU 11 into the memory card 53. Since the memory card 53 is separated from the main bus B, it can be loaded or unloaded with the power being on. Accordingly, the setting of the game etc. can be stored In a plurality of memory cards 53.

The basic apparatus 1 further comprises a parallel input/output (I/O) port 61 and a serial input/output (I/O) port 62 connected to the main bus B, respectively. Connection to a peripheral device can be achieved via the parallel I/O port 61, while connection to another video game apparatus can be achieved via the serial I/O port 62.

In the foregoing basic apparatus 1, when the power gets on or a reset process is executed while the CD-ROM 44 is loaded in the disk drive 41, the CPU 11 executes the OS stored in the ROM 14 to first initialize the whole apparatus, then control the disk control section 40 to read out the game program stored in the CD-ROM 44 and transfer it into the main memory 13, and then execute it. In this event, the data stored in the memory card 53 are also read into the main memory 13 as requested. Through the execution of the game program, the CPU 11 realizes the functional blocks as shown in FIG. 2 so that the video game apparatus generally designated by numeral 2 is presented.

Figure 2:
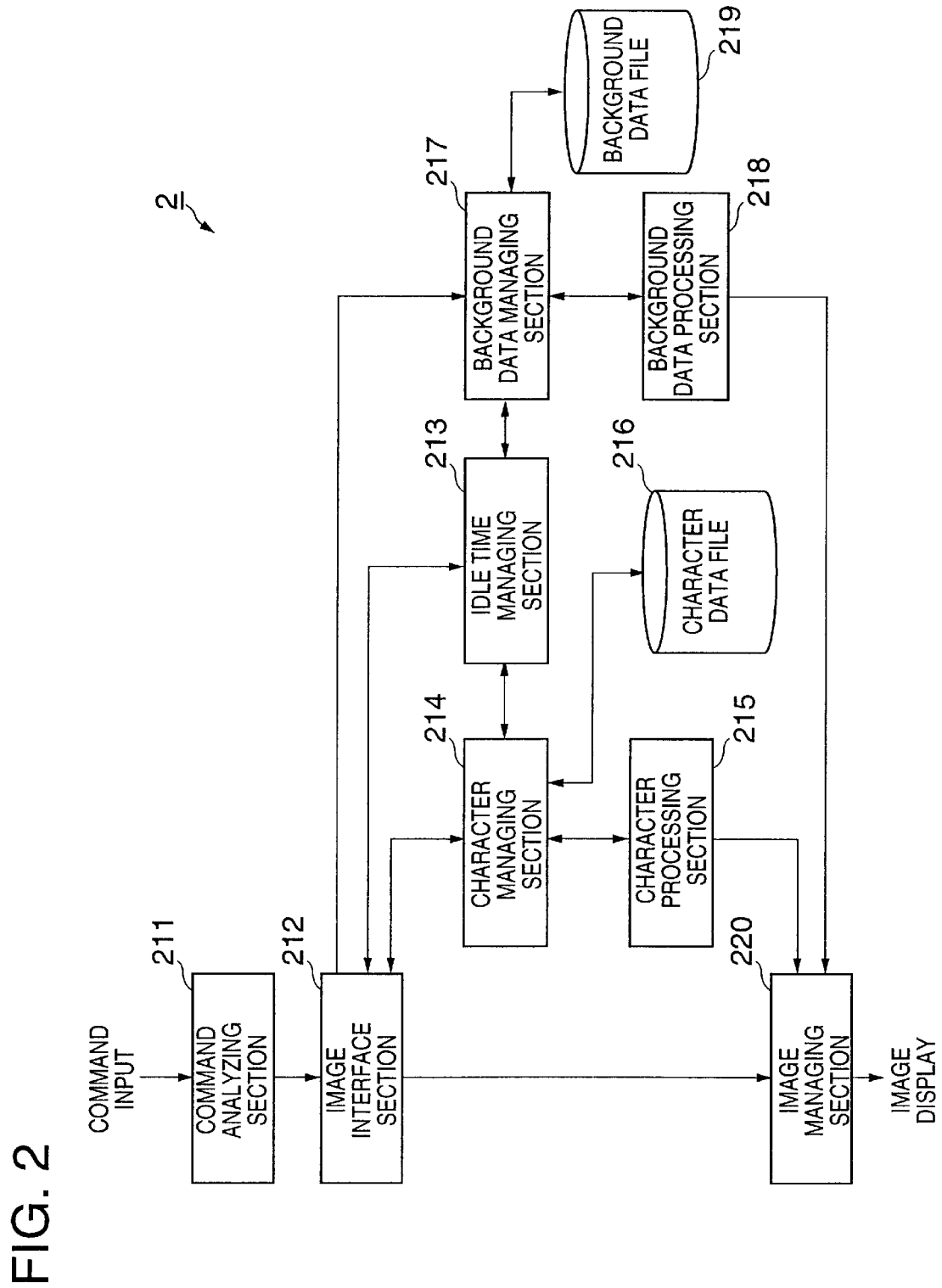
FIG. 2 is a functional block diagram of a video game apparatus according to a preferred embodiment of the present invention.

As shown in FIG. 2, the video game apparatus 2 comprises a command analyzing section 211, an image interface section 212, an idle time managing section 213, a character managing section 214, a character processing section 215, a character data file 216, a background data managing section 217, a background data processing section 218, a background data file 219 and an image managing section 220.

The command analyzing section 211 analyzes command inputs from the controller 52 via the communication control device 51 so as to execute required data controls. The command inputs include, for example, designation of a character image from the player, designation of motion of the character image by the player, designation of a dialogue option by the player and so on.

For example, when the display of a particular character image is designated, the command analyzing section 211 causes image element data of the character image set as a default value, and a standard idle time and parameter data with respect to the character image to be sent to the character managing section 214 from the character data file 216, so that the character image with expression is displayed on the display unit 25 by the image managing section 220 via the character processing section 215.

Further, the command analyzing section 211 loads into the main memory 13 the game program from the CD-ROM 44 and the saved data from the memory card 53 upon detection of the start or restart of the game. Further, upon detection of the stop or end of the game, the command analyzing section 211 saves into the memory card 53 data representing the progressing state of the game and parameter data as described above.

The image interface section 212 produces various menu images and items for helping the player easily input his/her intention interactively via the controller 52 in the progress of the game, such as a character selecting menu image for the player to select a desired character image, a character setting menu image for facilitating various settings with respect to a character and an input selection image for requesting the player to input a command in the progress of the game, and outputs them to the image managing section 220. The input selection image includes options to be answered. Each of the options is assigned a point value for increasing or decreasing later-described parameter data, such as the degree of friendship of a character relative to the player. Each option is further assigned image element data for changing expression of a character, which will be described later.

The player carries out command inputs through the foregoing images displayed on the display unit 25 via the image managing section 220. The image interface section 212 is arranged to output the same input selection image repeatedly by a given number of times based on a command.

The idle time managing section 213 has a function of, every time the image interface section 212 makes an input selection request via an input selection image, calculating an idle time for that input selection image, a function of counting an elapsed time just after making the request up to the termination of an idle time in a state invisible to the player, a function of detecting presence/absence of a command input during an idle time, and a function of detecting the passage of time at a time point when a command input is given during an idle time. As appreciated, the invisible state represents that the passage of time is not displayed on the display unit.

An idle time represents a time determined by a function of a standard idle time predetermined per character image and parameter data determined based on the past command input state of the player relative to the displayed character image. The standard idle times are stored in the CD-ROM 44, while the parameter data are stored in, for example, the memory card 53. These data are stored in the character data file 216 upon preparing the game environment.

The standard idle times are preset corresponding to personality features of the respective character images. For example, with respect to a character with an easy temper, the standard idle time is set relatively long, while with respect to a character with a hot temper, it is set relatively short.

Figures 3, 4, 5:
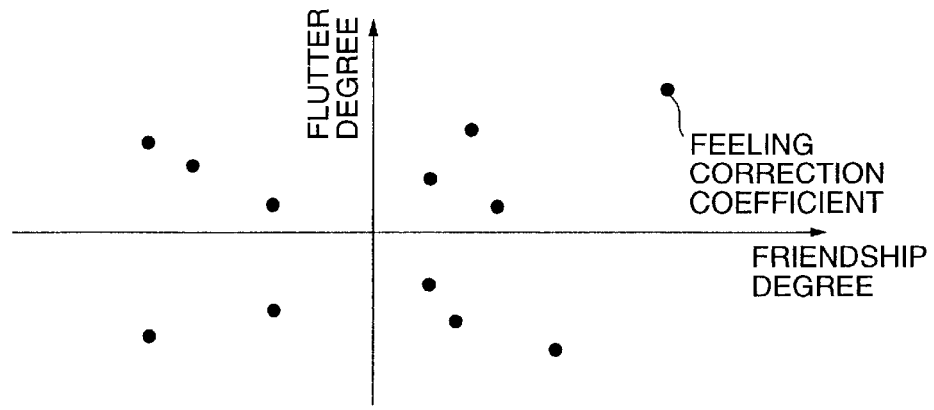
FIG. 3 is a diagram showing an example of standard idle times according to the preferred embodiment of the present invention.
FIG. 4 is a diagram showing an example of parameter data according to the preferred embodiment of the present invention.
FIG. 5 is a diagram showing an example of a relationship between correction values as parameter data and feelings of a character, according to the preferred embodiment of the present invention.

FIG. 3 is a diagram showing an example of standard idle times stored in the character data file 216. In the example of FIG. 3, a considerably long time is set for a character E. In contrast, with respect to a character N, an idle time quickly elapses. These times are not known by the player.

In this embodiment, the parameter data include the degree of friendship, the degree of flutter, a feeling correction coefficient determined in terms of the degree of friendship and the degree of flutter, and a correction value selected based on the feeling correction coefficient.

The degree of friendship is increased when, for example, the player selects, in an input selection image for dialogue, an option giving a favorable impression to a character in dialogue, or the player quickly selects one of options. On the other hand, the degree of friendship is decreased when, for example, the player selects an unfavorable option during dialogue, or the player does not input a command, i.e. select one of options, within a lapse of an idle time. The degree of flutter is increased or decreased, for example, depending on selection of an event among events with a character, or depending on behavior of the player in the event. FIG. 4 is a graph showing the feeling correction coefficients in terms of the degree of friendship and the degree of flutter, wherein it is seen that the feeling correction coefficients differ depending on characters.

The feeling correction coefficient is used for determining a feeling of a corresponding character so that a corresponding correction value can be selected as shown in FIG. 5. Specifically, as the degree of friendship or the degree of flutter decreases (i.e. as the feeling correction coefficient decreases), a correction value greater in a negative direction is selected. On the other hand, as the feeling correction coefficient increases, a correction value greater in a positive direction is selected.

The idle time is derived by adding the correction value to the standard idle time.

The idle time managing section 213 notifies information about presence/absence of a command input during the idle time and information about the passage of time at a time point of the command input to the image interface section 212, the character managing section 214 and the background data managing section 217.

The character managing section 214 manages each of the characters based on notifications from the image interface section 212 and the idle time managing section 213 and the data stored in the character data file 216. For example, the character managing section 214 updates the parameter data of the corresponding character depending on a command input state of the player. Further, the character managing section 214 retrieves the image element data of the corresponding character image and the current parameter data thereof depending on a command input state of the player, and sends them to the character processing section 215.

The character processing section 215 carries out a process of producing expression of the character image on the display unit 25 based on the foregoing image element data and parameter data.

The background data managing section 217 manages background data for expressing background environments of the characters. The background data are data for expressing, for example, dates with characters and other character-joining events, and are stored in the background data file 219. The background data processing section 218 retrieves the corresponding background data from the background data file 219 as requested and prepares data for displaying the background environment of the character in cooperation with the background data managing section 217. Using the foregoing GTE 21 and GPU 22, the image managing section 220 produces a character image with expression and a background image thereof and controls the display unit 25 to display them. Further, the image managing section 220 displays various menu images and items, a window for displaying character introduction data and so on, on the display unit 25 as requested.

Now, a display control method using the foregoing video game apparatus 2 will be described with reference to FIGS. 6 and 7.

Figure 6:
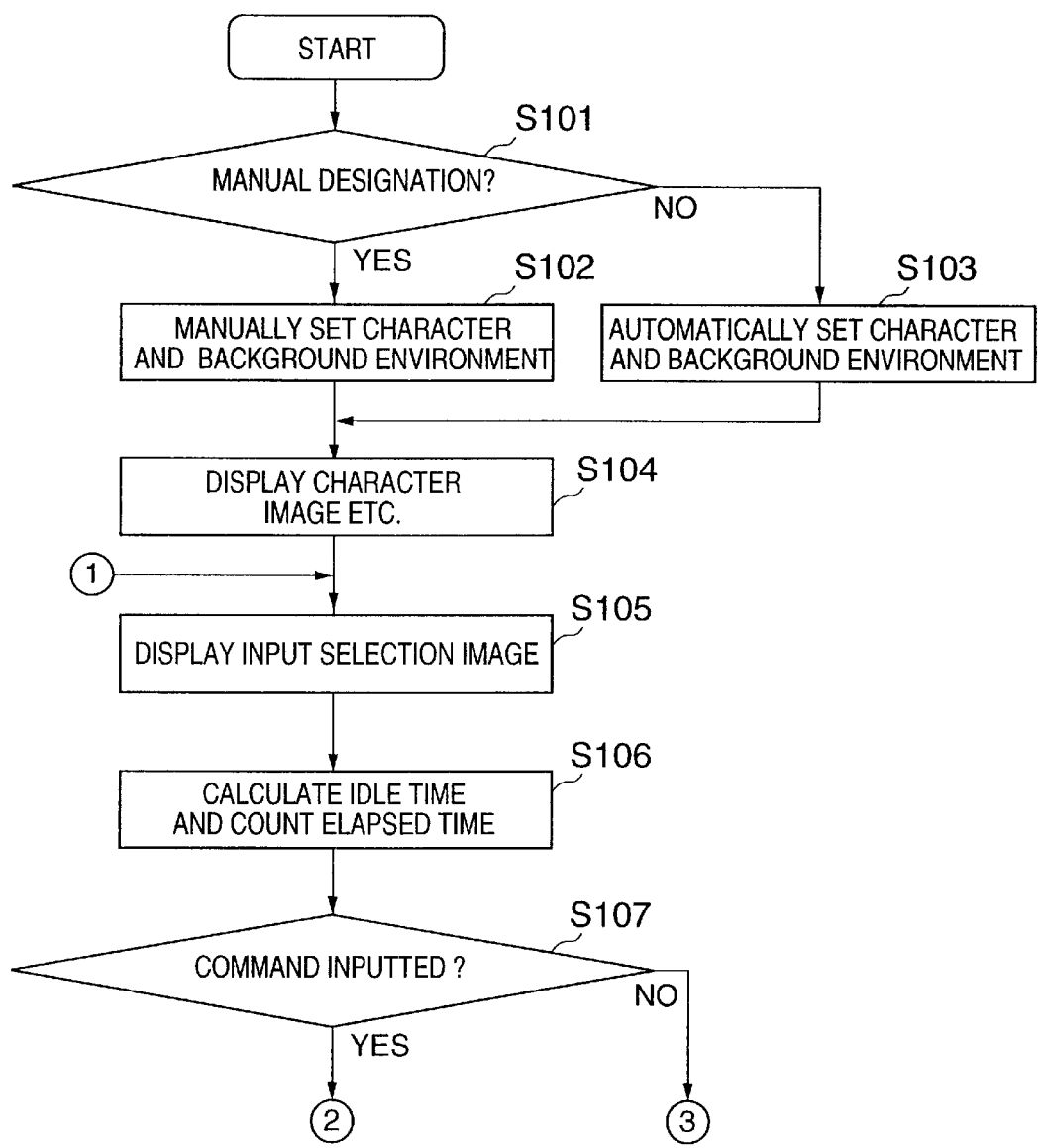
FIGS. 6 and 7 show a flowchart of a game procedure according to the preferred embodiment of the present invention.

In FIG. 6, when the player commands the game start via the controller 52, the command analyzing section 211 judges whether it is manual designation (step S101). In case of the manual designation (Yes at step S101), the player selects and sets a character and background data via a given menu image (step S102). On the other hand, unless it is the manual designation, a default character and default background data are automatically set (step S103).

After the character etc. are set, the character managing section 214 and the background data managing section 217 retrieve image element data and parameter data corresponding to the set character and background data from the character data file 216 and the background data file 219. Then, the character processing section 215, the background data processing section 218 and the image managing section 220 apply given processes to the retrieved data so as to display a character image with expression and a background image on the display unit 25 (step S104).

The image interface section 212 controls the display unit 25 to display an input selection image, such as an image for selecting a dialogue with a character, for requesting a command input by the player in the progress of the game (step S105). The idle time managing section 213 calculates a current idle time corresponding to the character and further counts an elapsed time from a time point of the display of the dialogue selecting image (step S106). At this time, the passing state of the idle time is not displayed on the display unit 25.

As described before, the idle time is calculated by adding a correction value (positive or negative correction value) to a standard idle time with respect to the character.

Figure 7:
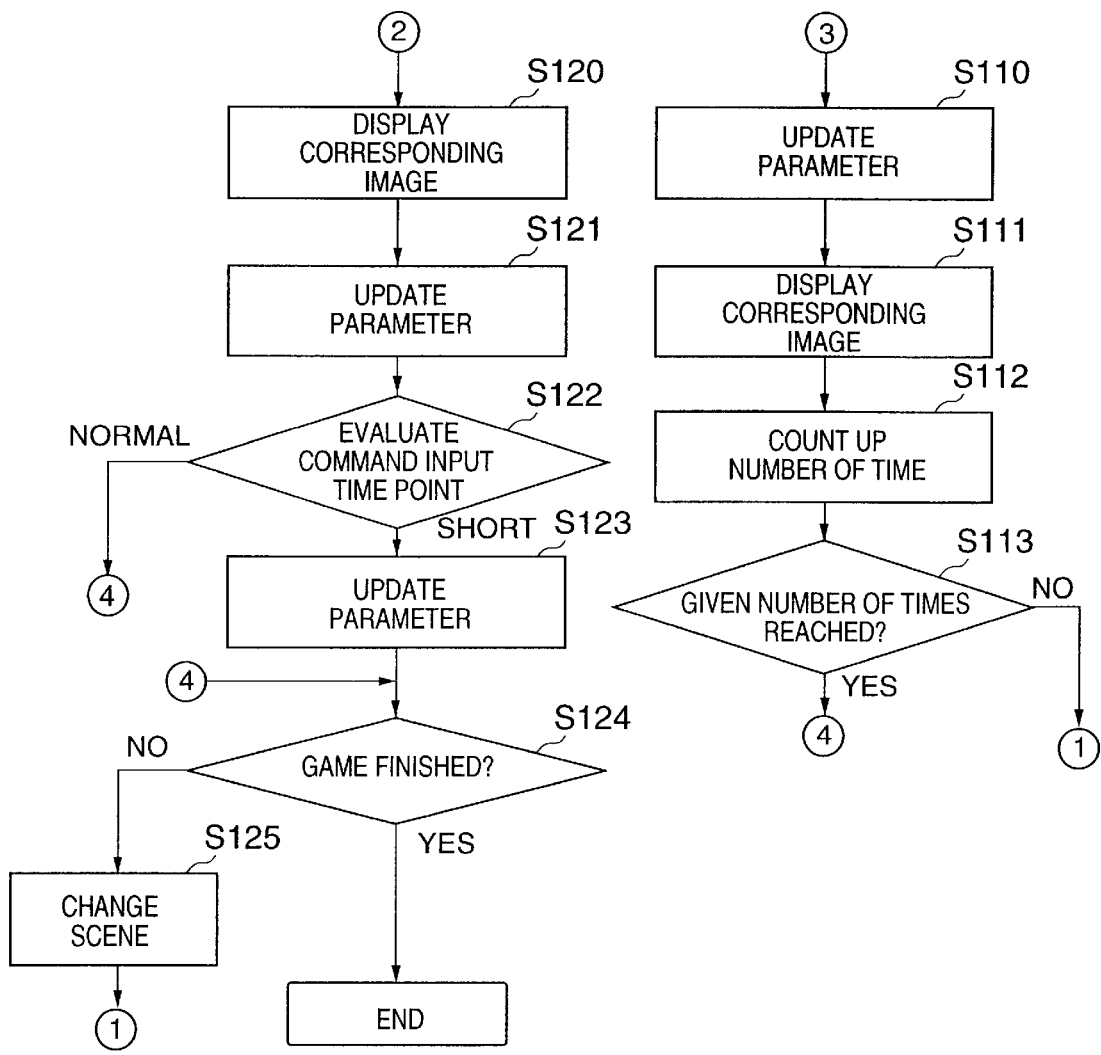

If no command input is given from the player within the idle time (No at step S107), the routine proceeds to step S110 shown in FIG. 7. At step S110, the character managing section 214 updates the parameter data about the character (step S110). Specifically, the character managing section 214 updates the parameter data so as to reduce the degree of friendship in consideration of no command input given from the player.

Thereafter, using the character managing section 214 and the background data managing section 217, data for producing expression of the character image caused by no command input, such as an angered expression of the character image, and data for producing a corresponding background image are retrieved from the character data file 216 and the background data file 219, respectively. Then, the character processing section 215 and the background data processing section 218 apply image processing to the data for producing the angered expression, which is then displayed on the display unit 25 via the image managing section 220 (step S111).

In parallel with the foregoing processes, the idle time managing section 213 counts up the number of times of occurrences of no command input (step S112). If the counted number is smaller than a given value (No at step S113), the routine returns to step S105 to display a dialogue selecting image with a dialogue urging a command input or with the same dialogues as the initial ones. At this time, the character image has the angered expression.

As described above, when the idle time has elapsed with no command input from the player, the parameter data are updated for use in the next calculation of the idle time, and further, the expression of the character is changed in a predetermined manner. This is repeated by given integer times.

On the other hand, if a command input is given from the player at step S107 (Yes at step S107), the routine proceeds to step S120 in FIG. 7. Specifically, using the character managing section 214 and the background data managing section 217, data for producing a display image based on the command input, i.e. data for displaying a scene corresponding to a selected dialogue, is retrieved from the character data file 216 and the background data file 219. Then, the character processing section 215 and the background data processing section 218 apply image processing to the data, which is then displayed on the display unit 25 via the image managing section 220 (step S120).

The character managing section 214 updates the corresponding parameter data based on a point value assigned to the selected dialogue (step S121). As appreciated, this point value Is reflected on the degree of friendship of the character relative to the player.

After the processes at steps S120 and S121, or in parallel with those processes, the idle time managing section 213 evaluates the time point of receipt of the command input after the display of the dialogue selecting image as requested. Specifically, when it is judged that an elapsed time from the display of the dialogue selecting image to the time point of receipt of the command input is "short" as compared with the idle time, i.e. if the player implements the command input quickly, the idle time managing section 213 notifies it to the character managing section 214 (Short at step S122). Then, the character managing section 214 updates the parameter data so as to increase the degree of friendship of the character (step S123). On the other hand, if it is judged at step S122 that the foregoing elapsed time is "equal" or "normal" as compared with the idle time, the parameter data are not updated (Normal at step S122).

After the process at step S122 or S123 has been finished or if answer at step S113 is Yes, the scene is changed to newly select a character and a background environment, and the processes of step S105 and subsequent steps are repeated (No at step S124: step S125). On the other hand, if the end of the game is commanded, the parameter data are saved into the memory card 53 if necessary, and the routine is terminated (Yes at step S124).

Similarly, when the interruption of the game is commanded via the controller 52, the parameter data are also saved into the memory card 53 if necessary. The parameter data saved in the memory card 53 are read out when "continued" is judged at the command analyzing section 211. Accordingly, the player can use the parameter data saved at the time point of the end or interruption of the game.

In the foregoing description, assuming that one cycle is defined as a time period from the display of a dialogue selecting image up to a command input by the player or up to the termination of an idle time, the idle time is not changed during the cycle and expression of a character is also not changed during the cycle. However, the idle time may be changed during the cycle, and the expression of the character may also be changed during the cycle. This can be achieved by dividing the foregoing time period into a plurality of time sections, and counting an elapsed time after the display of the dialogue selecting image per time section so as to handle each time section as the foregoing cycle.

Now, concrete examples of character images displayed on the display unit 25 by the foregoing display control method will be described with reference to FIGS. 8 to 12.

Figure 8:
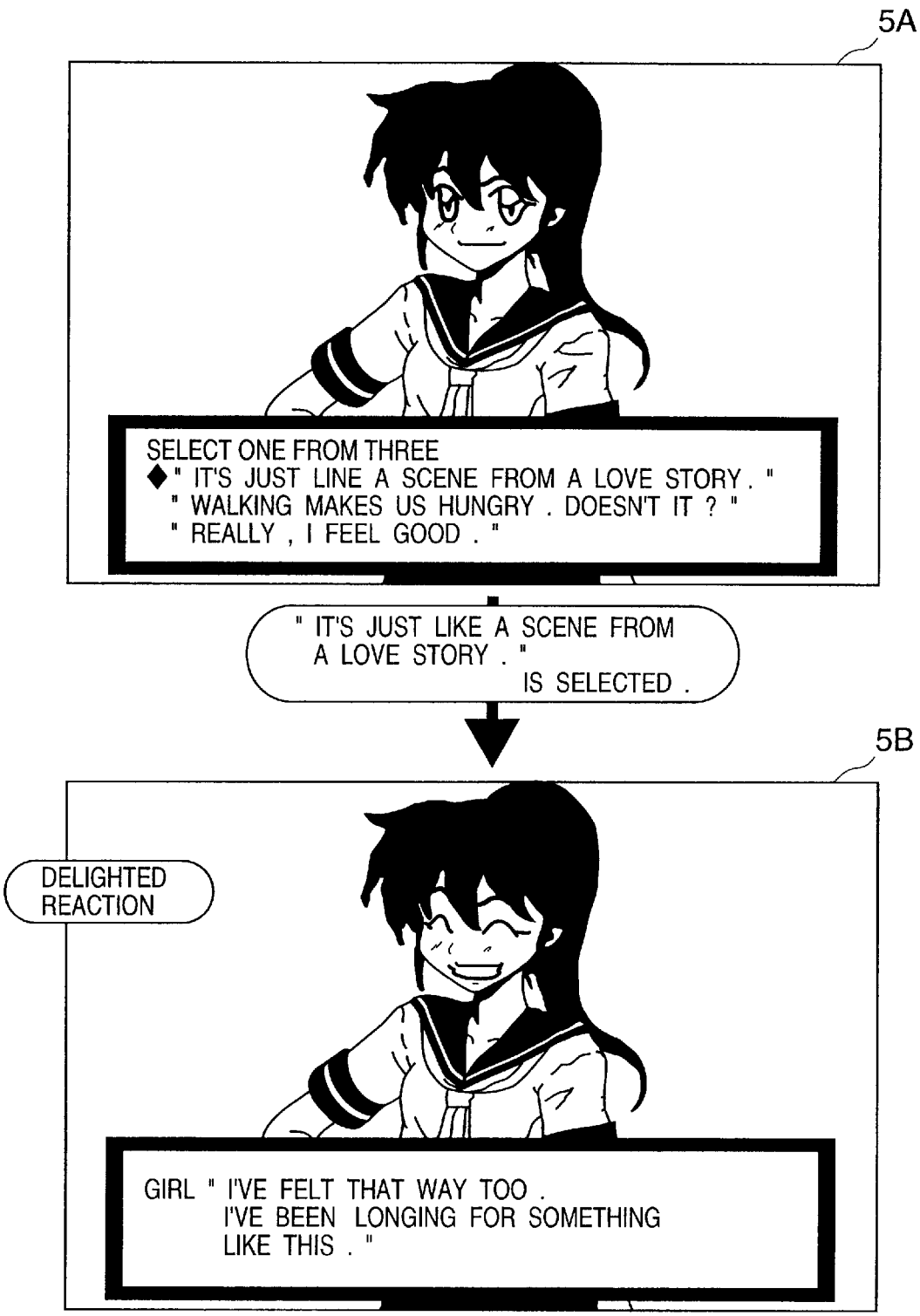
FIG. 8 is a diagram showing an example of a display image according to the preferred embodiment of the present invention.

In FIG. 8, a display image 5A is an example of a display image after executing steps S104 and S105 in FIG. 6. In the display image 5A, three dialogue options are displayed in front of a character so that the player can select one of them via the controller 52. Although the selected dialogue option is identified by a black diamond In the display image 5A, it may be identified by reversing the display.

A display image 5B shows the state wherein a display manner of the character is changed based on the dialogue selected by the player. In the display image 5B, in response to the selected dialogue "It's just like a scene from a love story", the character is changed to have "delighted" expression as compared with the display image 5A. Further, in response to the selected dialogue, a response dialogue of the character "I've felt that way too. I've been longing for something like this," is displayed in front of the character. In this case, the degree of friendship, in the parameter data, of the character relative to the player is enhanced by the dialogue selected by the player. The enhanced degree of friendship prolongs an idle time for this character as compared with that in the display image 5A. In this fashion, the game progresses like dialogue option display to the player→dialogue selection input from the player→display manner change and response dialogue of the character→parameter data updating→idle time correction.

Figure 9:
FIG. 9 is a diagram showing an example of a display image according to the preferred embodiment of the present invention.

A display image 6A in FIG. 9 is an input selection image which is the same as the foregoing display image 5A. The display image 6A shows that a dialogue with a black diamond "Walking makes us hungry, doesn't it?" is selected by the player. In a display image 6B, in response to the selected dialogue "Walking makes us hungry, doesn't it?", the character is changed to have "unsatisfied" expression as compared with the display image 6A. Further, a response dialogue of the character "Really? I was in such a good mood until now—" following the expression change is displayed in front of the character. In this case, the degree of friendship, in the parameter data, of the character relative to the player is lowered by the dialogue selected by the player. The lowered degree of friendship shortens an idle time for this character as compared with that in the display image 6A.

Figure 10:
FIG. 10 is a diagram showing an example of a display image according to the preferred embodiment of the present invention.

A display image 7A in FIG. 10 is an input selection image which is the same as the foregoing display image 5A or 6A. The display image 7A shows that a dialogue with a black diamond "Really, I feel good." is selected by the player. A display image 7B is responsive to the selected dialogue "Really, I feel good.", but expression of the character remains unchanged from that shown in the display image 7A. This means that the dialogue selected by the player does not change a feeling of the character relative to the player as compared with the foregoing display image 5B or 6B. On the other hand, although the expression is unchanged, a response dialogue of the character "It seems like all that pent-up fatigue Is falling away," is displayed in front of the character in response to the dialogue selected by the player.

Figure 11:
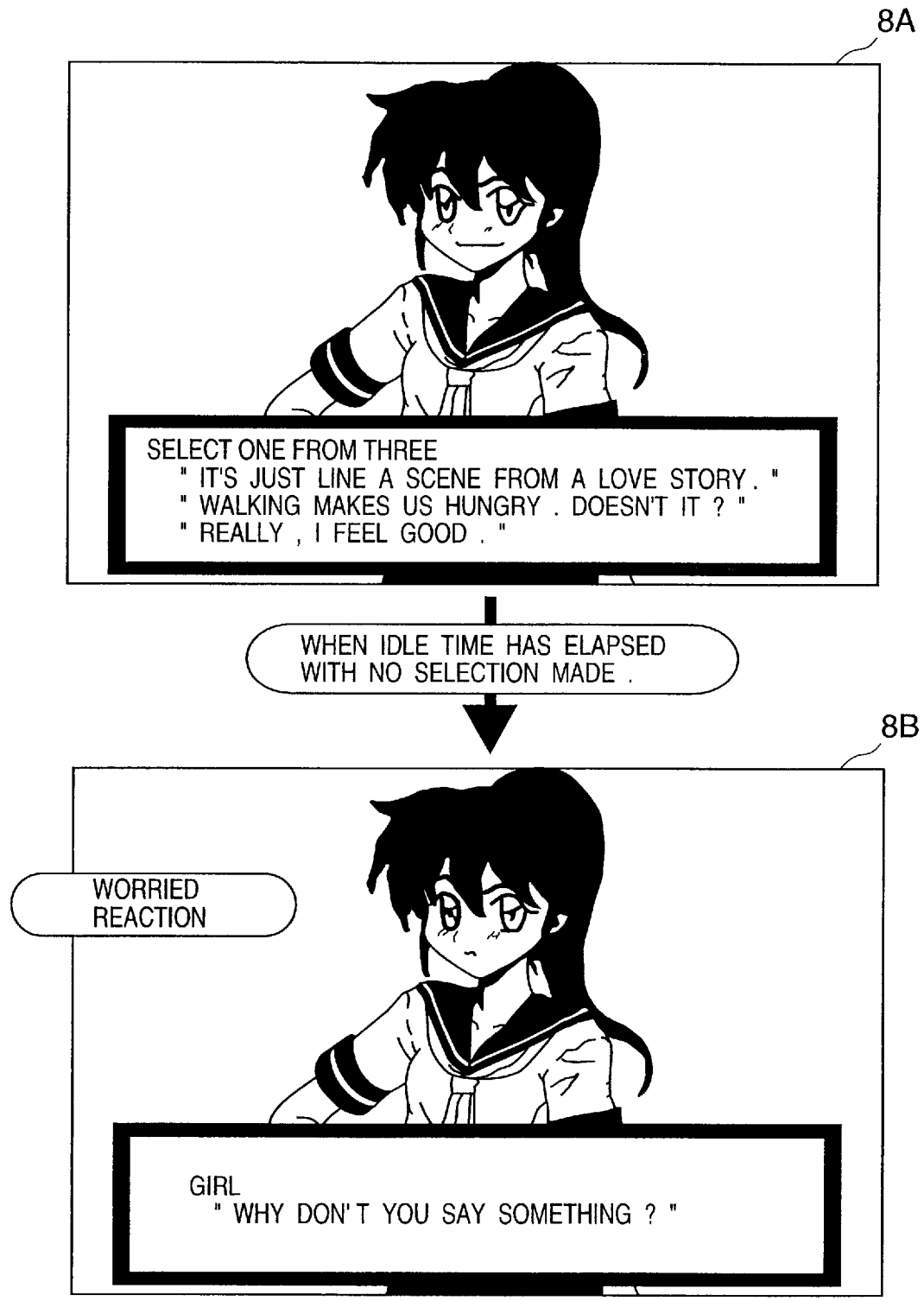
FIG. 11 is a diagram showing an example of a display image according to the preferred embodiment of the present invention.

A display image 8A in FIG. 11 is an input selection image which is the same as the foregoing display image 5A and shows the state wherein no command input is given within an idle time. Due to the first absence of a command input, the character is changed to have a "worried" expression. Further, a response dialogue of the character "Why don't you say something?" following the expression change is displayed so as to urge a dialogue command input by the player. Since no command input is carried out, the degree of friendship, in the parameter data, of the character is lowered. Thus, the idle time for this character is shortened as compared with that in the display image 8A.

Figure 12:
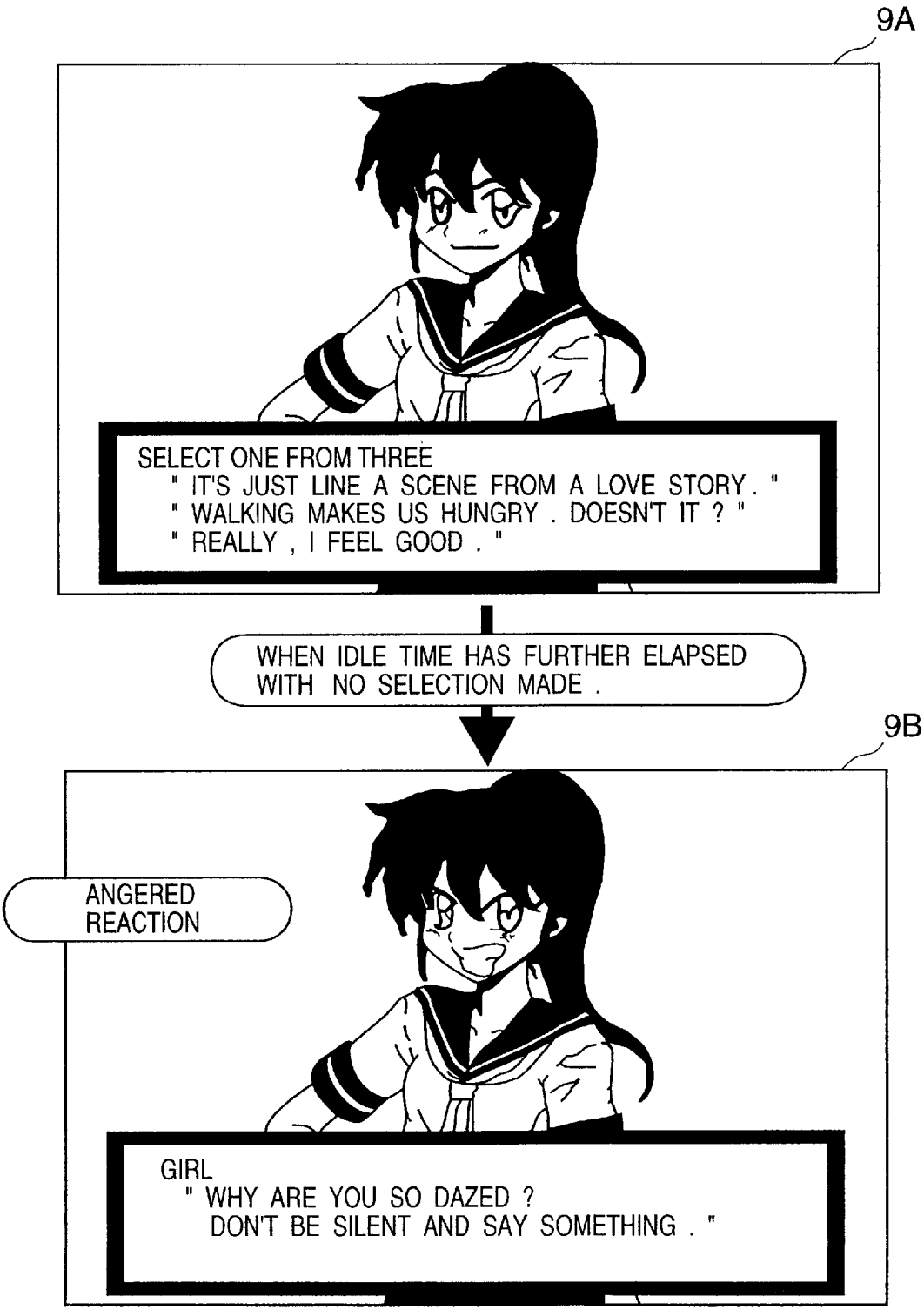
FIG. 12 is a diagram showing an example of a display image according to the preferred embodiment of the present invention.

A display image 9A in FIG. 12 is an input selection image after the game has further progressed from the display image 8B. In the display image 9A, expression of the character is the same as that in the display image 8B, and the dialogue options in the display image 8A are repeated. A display image 9B shows the state wherein the state of no command input relative to the dialogue options displayed in front of the character has been repeated by given integer times. In the shown example, the character is changed to have an "angered" expression as compared with that in the display image 9A. Further, a response dialogue of the character "Why are you so dazed? Don't be silent and say something," following the expression change is displayed. In this case, the degree of friendship of this character is further lowered so that a correction value is rapidly lowered as seen from FIG. 5. Thus, the idle time for this character is rapidly shortened as compared with that in the display image 9A.

As described above, when no command input is given within the idle time, different subsequent processes are carried out as compared with the case in which the command Input is given within the idle time.

In the foregoing example, the character is relatively hot-tempered. In case of a hotter-tempered character, the character may be changed to immediately have an "angered" expression without urging the command input by the player like in the display image 8B. It may also be arranged that in a background environment of an event such as a date, the character leaves with anger after having changed to have an "angered" expression. On the other hand, in case of an easy-tempered character, the same expression may be repeated many times.

Based on the changing expression of the character, the player can guess tendencies of his/her command inputs with respect to, for example, the response time, the selected dialogues and the degree of friendship.

Character images and background images thereof are not limited to those shown in the display images 5A to 9B of FIGS. 8 to 12, and may be variously changed in consideration of enhancing attraction relative to the player.

This may be achieved by providing character images and background images corresponding to, for example, designations from the player, dialogues selected by the player, magnitudes of idling times, and displaying them as requested. With this arrangement, the player can enjoy the character images and the background images which change in real time based on command inputs from the player.

As described above, in the video game apparatus 2 according to this embodiment, the passage of an idle time after an input selection request is counted in the state invisible to the player and, if a command input is not given within the idle time, the degree of friendship of a character relative to the player is decreased to shorten the idle time. Further, when the command input is not given within the idle time, expression of the character is changed. Thus, a feeling of tension can be given to the player with respect to command inputting so that the progress of the game can be effectively ensured. Further, since expression of the character is changed depending on a command input by the player in response to an input selection request, diversified image display manners can be achieved.

Further, by using the degree of friendship of a character relative to the player as one parameter to change expression of the character in succession, a more attractive game may be realized with more diversified display manners reflecting the state of command inputs from the player.

As appreciated, the foregoing basic apparatus 1 may be a personal computer. Further, In the foregoing embodiment, the command input is executed through the image Interface section 212. However, it may be arranged that a command input or an input selection request is carried out using a voice input device such as a microphone. In this case, a voice input section for converting voice data inputted via the voice input device into digital data needs to be connected to the main bus B of the basic apparatus 1, and further, a functional block of a voice input processing section for receiving the voice data and working cooperatively with the character managing section 214 and the background data managing section 217 needs to be provided. Further, the idle time managing section 213 detects presence/absence of a voice command input during an idle time and works cooperatively with the character managing section 214 and the background data managing section 217. With this arrangement, effects similar to those of the foregoing video game apparatus 2 can be achieved.

While the present invention has been described in terms of the preferred embodiment and the modifications thereof, the invention is not to be limited thereto, but can be embodied in various ways without departing from the principle of the invention as defined in the appended claims.

What is claimed is:

1. In an apparatus which displays a character image with expression on a display unit and performs a subsequent display process after receiving a command input from a player in response to an input selection request with respect to the character image being displayed, a display control method comprising the steps of:

counting, upon every occurrence of the input selection request, an elapsed time after the occurrence of the input selection request in a state invisible to the player; and changing, unless the command input is given by the player until a time point when said elapsed time reaches the end of an idle time associated with said character image, the expression of said character image being displayed on the display unit, and repeating the input selection request with the changed expression of said character image.

2. The display control method according to claim 1, wherein said character image is selected from a plurality of character images.

3. The display control method according to claim 1, wherein said idle time is determined by a function of a standard idle time predetermined for said character image and parameter data which are updated based on a past command input state of the player relative to said character image.

4. The display control method according to claim 3, wherein said standard idle time is set depending on a personality feature of said character image.

5. The display control method according to claim 3, wherein when said command input is not given until said time point, said parameter data are updated so as to shorten the idle time for the next input selection request with respect to said character image.

6. The display control method according to claim 3, wherein expression of said character image is changed based on said parameter data.

7. The display control method according to claim 1, wherein the command input from the player is interactively carried out via said display unit.

8. The display control method according to claim 1, wherein the command Input from the player is given by sound.

9. An image display control apparatus comprising:

an image processing section which displays a character image with expression on a display unit;

a request offering section which offers an input selection request to a player;

a counting section which counts an elapsed time after offering said input selection request in a state invisible to the player;

an idle time determining section which determines an idle time for a command input by the player in response to said input selection request;

and a control section which, when the command input is not given by the player until a time point when said elapsed time reaches said idle time associated with said character image, changes expression of said character image being displayed on the display unit, and repeats the input selection request with the changed expression of said character image.

10. The image display control apparatus according to claim 9, wherein said character image is selected from a plurality of character images each of which has its own idle time.

11. The image display control apparatus according to claim 9, wherein said idle time determining section determines said idle time based on a function of a standard idle time predetermined for said character image and parameter data which are updated based on a past command input state of the player relative to said character image.

12. The image display control apparatus according to claim 11, wherein said parameter data are stored in an exchangeable memory, and wherein said idle time determining section determines said idle time based on the function of the current parameter data read out from said memory and said standard idle time.

13. The image display control apparatus according to claim 12, wherein said control section changes expression of said character image based on said parameter data.

14. The image display control apparatus according to claim 11, wherein when said command input is not given until said time point, said control section updates said parameter data so as to shorten a next value of the idle time.

15. The image display control apparatus according to claim 9, further comprising an image interface section which controls said display unit to display an inputting image for carrying out said command input interactively.

16. The image display control apparatus according to claim 9, further comprising a sound input section which allows said command input to be performed by sound.

17. An image display control apparatus comprising:

an image processing section which selectively displays one of character images with expressions on a display unit;

a request offering section which interactively offers to a player an input selection request for a command input triggering a subsequent display process;

an idle time determining section which determines an idle time for the command input by the player in response to said input selection request;

a counting section which counts an elapsed time after offering said input selection request in a state invisible to the player; and a control section which, when the command input is not given by the player until a time point when said elapsed time reaches said idle time associated with said character image, changes expression of the character image being displayed on the display unit, and repeats the input selection request with the changed expression of said character image.

18. The image display control apparatus according to claim 17, wherein said idle time determining section determines said idle time based on a function of a standard idle time predetermined for said character image and parameter data which are updated based on a past command input state of the player relative to said character image.

19. The image display control apparatus according to claim 18, wherein said parameter data are stored in an exchangeable memory along with parameter data for the other character images, and wherein said idle time determining section determines said idle time based on the function of the parameter data read out from said memory and said standard idle time.

20. The image display control apparatus according to claim 18, wherein said control section changes expression of said character image based on said parameter data.

21. The image display control apparatus according to claim 18, wherein when said command input is not given until said time point, said control section updates said parameter data so as to shorten a next value of the idle time for said character image.

22. A computer-readable recording medium storing a program which causes a computer connected to a display unit and a data input unit to execute:

a process of displaying a character image with expression on the display unit;

a process of offering to a player an input selection request with respect to said character image and counting an elapsed time after offering said input selection request in a state invisible to the player;

a process of determining an idle time for a command input from the player via the data input unit in response to said input selection request; and a process of, when the command input is not given via the data Input unit until a time point when said elapsed time reaches said idle time associated with said character image, changing expression of said character image being displayed on the display unit, and repeating the input selection request with the changed expression of said character image.

23. The recording medium according to claim 22, wherein said character image is selected from a plurality of character images each of which has its own idle time.

24. The recording medium according to claim 22, wherein said program causes the computer to execute a subsequent display process awaiting the command input in response to said Input selection request.

25. The recording medium according to claim 22, wherein said program causes the computer to execute a process of interactively receiving the command input from the player via the display unit.

26. The recording medium according to claim 22, wherein said program causes the computer to execute a sound input function of receiving the command input from the player by sound.

27. The recording medium according to claim 22, wherein the process of determining the idle time is a process of obtaining a standard idle time predetermined for said character image and parameter data which are updated based on a past command input state of the player relative to said character image and determining said idle time based on the obtained standard idle time and parameter data.

28. The recording medium according to claim 27, wherein said standard idle time is set depending on a personality feature of said character image.

29. The recording medium according to claim 27, wherein when said command input is not given until said time point, said parameter data are updated so as to shorten a next value of the idle time for said character image.

30. The recording medium according to claim 27, wherein said program causes the computer to change expression of said character image based an said parameter data.

* * * * *

UNITED STATES PATENT AND TRADEMARK OFFICE
CERTIFICATE OF CORRECTION

PATENT NO. : 6,798,426 B1
DATED : September 28, 2004
INVENTOR(S) : Kazuhiro Tateishi It is certified that error appears in the above-identified patent and that said Letters Patent is hereby corrected as shown below:

Column 2,
Line 8, "Image" should read -- image --.

Column 3,
Line 21, "Image" should read -- image --.

Column 6,
Line 20, "Images" should read -- images --.

Column 7,
Line 18, after the word "If" insert the word -- in --.
Line 25, "In" should read -- in --.

Column 11,
Line 13, "Is" should read -- is --.

Column 12,
Line 46, "is" first instance should read -- is --.

Column 13,
Line 13, "Input" should read -- input --.

Column 14,
Line 58, "Input" should read -- input --.

Column 16,
Lines 29 and 41, "Input" should read -- input --.

UNITED STATES PATENT AND TRADEMARK OFFICE
CERTIFICATE OF CORRECTION

PATENT NO.   : 6,798,426 B1
DATED        : September 28, 2004
INVENTOR(S)  : Kazuhiro Tateishi It is certified that error appears in the above-identified patent and that said Letters Patent is hereby corrected as shown below:

<u>Column 16 (cont'd)</u>,
Line 66, delete the word "an" and in place thereof insert -- on --.

Signed and Sealed this

Eighth Day of February, 2005

JON W. DUDAS
*Director of the United States Patent and Trademark Office*